United States Patent
Xu et al.

(10) Patent No.: US 11,785,226 B1
(45) Date of Patent: Oct. 10, 2023

(54) ADAPTIVE COMPOSITE INTRA PREDICTION FOR IMAGE AND VIDEO COMPRESSION

(71) Applicant: GOOGLE INC., Mountain View, CA (US)

(72) Inventors: Yaowu Xu, Saratoga, CA (US); Hui Su, College Park, MD (US)

(73) Assignee: GOOGLE INC., Mountain View, CA (US)

( * ) Notice: Subject to any disclaimer, the term of this patent is extended or adjusted under 35 U.S.C. 154(b) by 132 days.

(21) Appl. No.: 15/487,516

(22) Filed: Apr. 14, 2017

Related U.S. Application Data

(63) Continuation of application No. 13/733,329, filed on Jan. 3, 2013, now Pat. No. 9,628,790.

(51) Int. Cl.
| | |
|---|---|
| H04N 19/159 | (2014.01) |
| H04N 19/182 | (2014.01) |
| H04N 19/176 | (2014.01) |

(52) U.S. Cl.
CPC ......... *H04N 19/159* (2014.11); *H04N 19/176* (2014.11); *H04N 19/182* (2014.11)

(58) Field of Classification Search
CPC ....................................................... H04N 19/21
See application file for complete search history.

(56) References Cited

U.S. PATENT DOCUMENTS

| | | |
|---|---|---|
| 5,144,426 A | 9/1992 | Tanaka et al. |
| 5,737,020 A | 4/1998 | Hall et al. |
| 5,838,597 A | 11/1998 | Pau et al. |

(Continued)

FOREIGN PATENT DOCUMENTS

| | | |
|---|---|---|
| CN | 102186086 A | 9/2011 |
| JP | 2005348280 A | 12/2005 |

(Continued)

OTHER PUBLICATIONS

Choi "Differential Pixel Value Coding for HEVC Lossless Compression," Advanced Video Coding for Next-Generation Multimedia Services, Published Jan. 9, 2013 (Year: 2013).*

(Continued)

*Primary Examiner* — Shadan E Haghani
(74) *Attorney, Agent, or Firm* — Young Basile Hanlon & MacFarlane, P.C.

(57) ABSTRACT

Adaptive composite intra-prediction may include in response to a determination that a first prediction pixel from a first block immediately adjacent to a first edge of a current block is available for predicting a current pixel of the current block, determining whether a second prediction pixel from a second block immediately adjacent to a second edge of the current block is available for predicting the current pixel, wherein the second edge is opposite the first edge, and, in response to a determination that the second prediction pixel is available, generating a prediction value for the current pixel based on at least one of the first prediction pixel or the second prediction pixel. Adaptive composite intra-prediction may include generating a reconstructed pixel corresponding to the current pixel based on the prediction value, including the reconstructed pixel in the decoded current block, and outputting or storing the decoded current block.

4 Claims, 7 Drawing Sheets

(56) References Cited

U.S. PATENT DOCUMENTS

| | | | |
|---|---|---|---|
| 6,032,113 A | 2/2000 | Graupe | |
| 6,144,322 A | 11/2000 | Sato | |
| 6,157,676 A | 12/2000 | Takaoka et al. | |
| 6,167,162 A | 12/2000 | Jacquin et al. | |
| 6,373,895 B2 | 4/2002 | Saunders et al. | |
| 6,449,312 B1 | 9/2002 | Zhang et al. | |
| 6,816,552 B2 | 11/2004 | Demos | |
| 7,233,621 B2 | 6/2007 | Jeon | |
| 7,266,150 B2 | 9/2007 | Demos | |
| 7,308,145 B2 | 12/2007 | Abe et al. | |
| 7,310,373 B2 | 12/2007 | Kondo et al. | |
| 7,466,774 B2 | 12/2008 | Boyce | |
| 7,529,302 B2 | 5/2009 | Mukerjee et al. | |
| 7,564,902 B2 | 7/2009 | Sasai et al. | |
| 7,570,691 B2 | 8/2009 | Jeon | |
| 7,580,456 B2 | 8/2009 | Li et al. | |
| 7,606,307 B2 | 10/2009 | Jeon | |
| 7,606,310 B1 | 10/2009 | Ameres et al. | |
| 7,733,380 B1 | 6/2010 | Cote et al. | |
| 7,756,348 B2 | 7/2010 | Mukherjee et al. | |
| 7,809,059 B2 | 10/2010 | Yin et al. | |
| 8,005,144 B2 | 8/2011 | Ji et al. | |
| 8,085,845 B2 | 12/2011 | Tourapis et al. | |
| 8,085,846 B2 | 12/2011 | Tourapis et al. | |
| 8,135,064 B2 | 3/2012 | Tasaka et al. | |
| 8,144,786 B2 | 3/2012 | MacDonald Boyce | |
| 8,295,354 B2 | 10/2012 | Boyce | |
| 8,315,309 B2 | 11/2012 | Min et al. | |
| 8,320,464 B2 | 11/2012 | Raveendran et al. | |
| 8,457,200 B2 | 6/2013 | Andersson et al. | |
| 8,559,513 B2 | 10/2013 | Demos | |
| 8,644,374 B2 | 2/2014 | Chou et al. | |
| 8,699,572 B2 | 4/2014 | Demos | |
| 8,705,616 B2 | 4/2014 | He et al. | |
| 8,718,140 B1 | 5/2014 | Cai et al. | |
| 8,737,824 B1 | 5/2014 | Bultje | |
| 8,761,257 B2 | 6/2014 | Demos | |
| 8,891,624 B2 | 11/2014 | Jeon | |
| 8,929,450 B2 | 1/2015 | Lou et al. | |
| 8,953,679 B2 | 2/2015 | Kim et al. | |
| 9,066,104 B2 | 6/2015 | Wang et al. | |
| 9,185,414 B1 | 11/2015 | Suvanto | |
| 2002/0181594 A1 | 12/2002 | Katsavounidis et al. | |
| 2003/0012285 A1 | 1/2003 | Kim | |
| 2003/0012287 A1 | 1/2003 | Katsavounidis et al. | |
| 2003/0026343 A1 | 2/2003 | Kim et al. | |
| 2003/0227977 A1 | 12/2003 | Henocq | |
| 2004/0051798 A1 | 3/2004 | Kakarala et al. | |
| 2005/0018772 A1 | 1/2005 | Sung et al. | |
| 2005/0105614 A1 | 5/2005 | Katsavounidis et al. | |
| 2005/0105625 A1 | 5/2005 | Kim et al. | |
| 2005/0149831 A1 | 7/2005 | Katsavounidis et al. | |
| 2005/0207497 A1 | 9/2005 | Rovati et al. | |
| 2005/0243920 A1 | 11/2005 | Murakami et al. | |
| 2005/0254584 A1 | 11/2005 | Kim et al. | |
| 2005/0281479 A1 | 12/2005 | Song | |
| 2006/0029136 A1 | 2/2006 | Cieplinski et al. | |
| 2006/0195881 A1 | 8/2006 | Segev et al. | |
| 2006/0215751 A1 | 9/2006 | Reichel et al. | |
| 2006/0245497 A1 | 11/2006 | Tourapis et al. | |
| 2007/0047648 A1 | 3/2007 | Tourapis et al. | |
| 2007/0047649 A1 | 3/2007 | Suzuki et al. | |
| 2007/0053427 A1 | 3/2007 | Henocq | |
| 2007/0098067 A1 | 5/2007 | Kim et al. | |
| 2007/0110202 A1 | 5/2007 | Casler et al. | |
| 2007/0140352 A1 | 6/2007 | Bhaskaran et al. | |
| 2007/0153897 A1 | 7/2007 | Yan | |
| 2007/0153898 A1* | 7/2007 | Yim | H04N 19/895 375/240.16 |
| 2007/0153899 A1 | 7/2007 | Koto et al. | |
| 2007/0206931 A1 | 9/2007 | Barbieri et al. | |
| 2008/0056356 A1 | 3/2008 | Wang et al. | |
| 2008/0084929 A1 | 4/2008 | Li | |
| 2008/0130754 A1 | 6/2008 | Winger | |
| 2008/0212678 A1 | 9/2008 | Booth et al. | |
| 2008/0247464 A1 | 10/2008 | Seregin et al. | |
| 2008/0260031 A1 | 10/2008 | Karczewicz | |
| 2008/0267292 A1 | 10/2008 | Ito et al. | |
| 2008/0285655 A1 | 11/2008 | Au et al. | |
| 2009/0010556 A1 | 1/2009 | Uchibayashi et al. | |
| 2009/0034619 A1 | 2/2009 | Mukherjee et al. | |
| 2009/0080518 A1 | 3/2009 | Au et al. | |
| 2009/0110067 A1 | 4/2009 | Sekiguchi et al. | |
| 2009/0175338 A1 | 7/2009 | Segall | |
| 2009/0196342 A1 | 8/2009 | Divorra Escoda et al. | |
| 2009/0232207 A1 | 9/2009 | Chen | |
| 2009/0257492 A1 | 10/2009 | Andersson et al. | |
| 2009/0257495 A1 | 10/2009 | Chujoh et al. | |
| 2010/0034260 A1 | 2/2010 | Shimizu et al. | |
| 2010/0128995 A1 | 5/2010 | Drugeon et al. | |
| 2010/0150394 A1 | 6/2010 | Bloom et al. | |
| 2010/0177826 A1 | 7/2010 | Bhaumik et al. | |
| 2010/0195715 A1 | 8/2010 | Liu et al. | |
| 2010/0220790 A1 | 9/2010 | Jeon et al. | |
| 2010/0266008 A1 | 10/2010 | Reznik | |
| 2010/0278269 A1 | 11/2010 | Andersson et al. | |
| 2010/0290530 A1 | 11/2010 | Huang et al. | |
| 2010/0303149 A1 | 12/2010 | Yasuda et al. | |
| 2011/0002386 A1 | 1/2011 | Zhang | |
| 2011/0032983 A1 | 2/2011 | Sezer | |
| 2011/0051804 A1 | 3/2011 | Chou et al. | |
| 2011/0135181 A1 | 6/2011 | Yan et al. | |
| 2011/0182357 A1* | 7/2011 | Kim | H04N 19/167 375/240.12 |
| 2011/0200109 A1 | 8/2011 | Joshi et al. | |
| 2011/0202160 A1 | 8/2011 | Moyne | |
| 2011/0222608 A1 | 9/2011 | Gao et al. | |
| 2011/0228840 A1 | 9/2011 | Yamori | |
| 2011/0228858 A1 | 9/2011 | Budagavi et al. | |
| 2011/0235930 A1 | 9/2011 | Kim et al. | |
| 2011/0243229 A1 | 10/2011 | Kim et al. | |
| 2011/0249734 A1 | 10/2011 | Segall et al. | |
| 2011/0249741 A1 | 10/2011 | Zhao et al. | |
| 2011/0249756 A1 | 10/2011 | Doepke | |
| 2011/0261886 A1 | 10/2011 | Suzuki et al. | |
| 2011/0280304 A1 | 11/2011 | Jeon et al. | |
| 2012/0008683 A1 | 1/2012 | Karczewicz et al. | |
| 2012/0027094 A1 | 2/2012 | Sato et al. | |
| 2012/0082219 A1 | 4/2012 | Sun et al. | |
| 2012/0201293 A1 | 8/2012 | Guo et al. | |
| 2012/0243614 A1* | 9/2012 | Hong | H04N 19/52 375/240.24 |
| 2012/0250769 A1 | 10/2012 | Bross et al. | |
| 2012/0300837 A1 | 11/2012 | Wilkins et al. | |
| 2012/0307884 A1 | 12/2012 | MacInnis | |
| 2012/0307910 A1 | 12/2012 | Srinivasan et al. | |
| 2013/0016785 A1 | 1/2013 | Wang et al. | |
| 2013/0022102 A1 | 1/2013 | Casula | |
| 2013/0022117 A1 | 1/2013 | Lou et al. | |
| 2013/0022119 A1 | 1/2013 | Chien et al. | |
| 2013/0027230 A1 | 1/2013 | Marpe et al. | |
| 2013/0051467 A1 | 2/2013 | Zhou et al. | |
| 2013/0101039 A1 | 4/2013 | Florencio | |
| 2013/0129237 A1 | 5/2013 | Yie et al. | |
| 2013/0259129 A1 | 10/2013 | Sato | |
| 2014/0010295 A1* | 1/2014 | Lu | H04N 19/00569 375/240.12 |
| 2014/0140408 A1 | 5/2014 | Lee et al. | |
| 2014/0294320 A1 | 10/2014 | Kokaram et al. | |
| 2016/0065968 A1 | 3/2016 | Suvanto | |

FOREIGN PATENT DOCUMENTS

| | | |
|---|---|---|
| JP | 2007267414 A | 10/2007 |
| KR | 20120135828 A | 12/2012 |
| WO | 2009051419 A2 | 4/2009 |
| WO | 2012126340 A1 | 9/2012 |

OTHER PUBLICATIONS

Zhang, Yixiong et al.; "Motion Compensation Using Polyline Based Block Prediction"; 1Department of Communication Engineering,

(56) References Cited

OTHER PUBLICATIONS

Xiamen University, Xiamen 361005, China; Zhejiang University, Hangzhou 310027, China; Fuzhou University, Fuzhou 350108, China; pp. 1-5.
Hung et al.; "On Macroblock Partition for Motion Compensation"; Universidade de Brasilia, Brazil; Hewlett-Packard Laboratories, USA; pp. 1-4.
Yuan et al.; "Quadtree Based Nonsquare Block Structure for Inter Frame Coding in High Efficiency Video Coding"; IEEE Transactions on Circuits and Systems for Video Technology, vol. 22, No. 12, Dec. 2012; pp. 1707-1719.
Bankoski et al. "Technical Overview of VP8, an Open Source Video Codec for the Web". Dated Jul. 11, 2011.
Bankoski et al., "VP8 Data Format and Decoding Guide" Independent Submission. RFC 6389, Dated Nov. 2011.
Bankoski et al., "VP8 Data Format and Decoding Guide; draft-bankoski-vp8-bitstream-02" Network Working Group. Internet-Draft, May 18, 2011, 288 pp.
Cassidy, Sean, An Analysis of VP8, a New Video Codec for the Web, Nov. 2011, Rochester Institute of Technology, Rochester NY.
Chen, et al., "SaVE: Sensor-assisted Motion Estimation for Efficient H.264/AVC Video Encoding." MM'09, Oct. 19-24, 2009, 10 pages, ACM, Beijing, China.
Chen, Michael C., et al.; "Design and Optimization of a Differentially Coded Variable Block Size Motion Compensation System", IEEE 1996, 4 pp.
Chen, Xing C., et al.; "Quadtree Based Adaptive Lossy Coding of Motion Vectors", IEEE 1996, 4 pp.
Guillotel, Philippe, et al.; "Comparison of motion vector coding techniques", SPIE vol. 2308, 1994, 11 pp.
H.264 video compression standard.: New possibilities within video surveillance. 2008, 10 pages, Axis Communications.
International Search Report and Written Opinion of the International Searching Authority for International Application No. PCT/US2012/021599, dated Mar. 28, 2012.
International Search Report and Written Opinion of the International Searching Authority for International Application No. PCT/US2012/021606, dated Mar. 28, 2012.
Jung,, J., "Core Experiment 9: Motion Vector Coding," Document # JCTVC-C509, Guangzhou, China, Oct. 2010.
Karczewicz, Marta, et al.; "Video Coding Using Motion Compensation With Polynomial Motion Vector Fields", IEEE COMSOC EURASIP, First International Workshop on Wireless Image/Video Communications—Sep. 1996, 6 pp.
Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.
Kuroki et al., Adaptive Arithmetic Coding for Image Prediction Errors, 2004.
Li B., et al., "Redundancy reduction in Cbf and merge coding", Document # JCTVC-C277, p. 6, Oct. 2, 2010.
Li S., et al.; "Direct Coding for Bipredicitive Slices in the H.264 Standard," IEEE Transactions on Circuits and Systems for Video Technology; vol. 15; No. 1; pp. 119-126; Jan. 1, 2005.
Liu, Bede, et al.; "A simple method to segment motion field for video coding", SPIE vol. 1818, Visual Communications and Image Processing 1992, 10 pp.
Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, SouthKorea, Nov. 2, 1998, 34 pp.
Martin, Graham R., et al.; "Reduced Entropy Motion Compensation Using Variable Sized Blocks", SPIE vol. 3024, 1997, 10 pp.
Mozilla, "Introduction to Video Coding Part 1: Transform Coding", Video Compression Overview, Mar. 2012, 171 pp.
Nicolas, H., et al.; "Region-based motion estimation using deterministic relaxation schemes for image sequence coding", IEEE 1992, 4 pp.
Nokia, Inc., Nokia Research Center, "MVC Decoder Description", Telecommunication Standardization Sector, Study Period 1997-2000, Geneva, Feb. 7, 2000, 99 pp.
Orchard, Michael T .; "Exploiting Scene Structure in Video Coding", IEEE 1991, 5 pp.
Orchard, Michael T.; "Predictive Motion-Field Segmentation for Image Sequence Coding", IEEE Transactions on Circuits and Systems for Video Technology, vol. 3, No. 1, Feb. 1993, 17 pp.
Overview; VP7 Data Format and Decoder. Version 1.5. On2 Technologies, Inc. Dated Mar. 28, 2005.
Schiller, H., et al.; "Efficient Coding of Side Information in a Low Bitrate Hybrid Image Coder", Signal Processing 19(1990) Elsevier Science Publishers B.V. 61-73, 13 pp.
Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.
Seiler, et al., "Spatio-Temporal Prediction in Video Coding by Spatially Refined Motion Compensation," ICIP, 2008, pp. 2788-2791.
Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
Somasundaram et al., A Pattern-Based Residual Vector Quantization Algorithm (PBRVQ) for Compressing Images, 2009.
Steliaros, Michael K., et al.; "Locally-accurate motion estimation for object-based video coding", SPIE vol. 3309, 1997, 11 pp.
Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.
Strobach, Peter; "Tree-Structured Scene Adaptive Coder", IEEE Transactions on Communications, vol. 38, No. 4, Apr. 1990, 10 pp.
Sun et al., Motion-Compensated Vector Quantization with a Dynamic Codebook, 1990.
VP6 Bitstream and Decoder Specification, Version 1.03, (On2 Technologies, Inc.), Dated Oct. 29, 2007.
WebM Project, WebM Video Hardware RTLs, http://www.webmproject.org/hardware/, 3 pp, (Jun. 27, 2012).
Wiegand, Thomas, et al.; Long-Term Memory Motion-Compensated Prediction, date unknown.
Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.
Wikipedia, the free encyclopedia, "Application-specific integrated circuit", http://en.wikipedia.org/wiki/Application-specific_integrated_circuit, 7 pp (Jun. 27, 2012).
Winken (Fraunhofer HHI) M. et al., "Description of Video Coding Technology Proposal by Fraunhoffer HHI", 1. JCT-VC Meeting Apr. 15, 2010-Apr. 23, 2010; Dresden; (Joint Collaborative Team on Video Coding of IS/IEC JTC1/SC29/WG11 and ITU-T SG.16); JCTVC-A116, URL:http://wftp3.itu.int/AV-ARCH/JCTVC-SITE/, No. Apr. 24, 2010, all pages.
Xiao, "Macroblock Level Hybrid Temporal-Spatial Prediction for H.264/AVC," Circuits and Systems (ISCAS), Proceedings of 2010 IEEE International Symposium, Paris, 4 pages.

(56) References Cited

OTHER PUBLICATIONS

Yusuke Itani et al., "Adaptive Direct Vector Derivation for Video Coding," Picture Coding Symposium, Dec. 8, 2010 C509, Guangzhou, China, Oct. 2010.
X. Jin, K. Ngan, and G. Zhu, Combined Inter-Intra Prediction for High Definition Video Coding, Picture Coding Symposium 2007.
E. M. Hung, R. L. de Queiroz and D. Mukherjee, "On macroblock partition for motion compensation," Proc. IEEE Intl. Conf. on Image Processing, ICIP, Atlanta, USA, pp. 16971700, Oct. 2006.
Wang et al.; "Complexity Reduction and Performance Improvement for Geometry Partitioning in Video Coding", IEEE Transactions on Circuits and Systems for Video Technology, vol. 23, No. 2, Feb. 2013; pp. 338-352.
Ferreira et al.; "Efficiency Improvements for a Geometric-Partition-Based Video Coder"; Universidade de Brasilia; Departamento de Engenharia Eletrica, Brasilia, Brazil; Hewlett-Packard Laboratories, Palo Alto, USA.; pp. 1-4.

* cited by examiner

ADAPTIVE COMPOSITE INTRA PREDICTION FOR IMAGE AND VIDEO COMPRESSION

CROSS-REFERENCE TO RELATED APPLICATION(S)

This application claims priority to and the benefit of U.S. patent application Ser. No. 13/733,329, filed Jan. 3, 2013, the entire disclosure of which is hereby incorporated by reference.

TECHNICAL FIELD

This disclosure relates to video encoding and decoding.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

SUMMARY

Implementations of systems, methods, and apparatuses for encoding and decoding a video signal using adaptive composite intra prediction are disclosed herein.

One aspect of the disclosed implementations is a method including adaptive composite intra-prediction. The method includes generating, by a processor in response to instructions stored on a non-transitory computer readable medium, a decoded current block by decoding an encoded current block, wherein decoding the encoded current block includes adaptive composite intra-prediction. Adaptive composite intra-prediction includes, in response to a determination that a first prediction pixel from a first block immediately adjacent to a first edge of the encoded current block is available for predicting a current pixel of the encoded current block, determining whether a second prediction pixel from a second block immediately adjacent to a second edge of the encoded current block is available for predicting the current pixel, wherein the second edge is opposite the first edge, and in response to a determination that the second prediction pixel is available, generating a prediction value for the current pixel based on at least one of the first prediction pixel or the second prediction pixel. Adaptive composite intra-prediction includes generating a reconstructed pixel corresponding to the current pixel based on the prediction value, and including the reconstructed pixel in the decoded current block. The method includes outputting or storing the decoded current block.

Another aspect of the disclosed implementations is a method including adaptive composite intra-prediction. The method includes generating, by a processor in response to instructions stored on a non-transitory computer readable medium, an encoded current block by encoding a current input block, wherein encoding the current input block includes adaptive composite intra-prediction. Adaptive composite intra-prediction includes, in response to a determination that a first prediction pixel from a first block immediately adjacent to a first edge of the current input block is available for predicting a current pixel of the current input block, determining whether a second prediction pixel from a second block immediately adjacent to a second edge of the current input block is available for predicting the current pixel, wherein the second edge is opposite the first edge, and in response to a determination that the second prediction pixel is available, generating a prediction value for the current pixel based on at least one of the first prediction pixel or the second prediction pixel. Adaptive composite intra-prediction includes generating an encoded pixel corresponding to the current pixel based on the prediction value, and including the encoded pixel in the encoded current block. The method includes outputting or storing the encoded current block.

Another aspect of the disclosed implementations is a method including adaptive composite intra-prediction. The method includes generating, by a processor in response to instructions stored on a non-transitory computer readable medium, a decoded current block by decoding an encoded current block, wherein decoding the encoded current block includes adaptive composite intra-prediction. Adaptive composite intra-prediction includes, in response to a determination that a first prediction pixel from a first block immediately adjacent to a first edge of the encoded current block is available for predicting a current pixel of the encoded current block, determining whether a second prediction pixel from a second block immediately adjacent to a second edge of the encoded current block is available for predicting the current pixel, wherein the second edge is opposite the first edge, and, in response to a determination that the second prediction pixel is available, identifying a third prediction pixel from a third block immediately adjacent to a third edge of the encoded current block for predicting a current pixel of the encoded current block, and generating a prediction value for the current pixel, wherein, on a condition that a distance of the current pixel from the first edge exceeds a distance of the current pixel from the second edge and on a condition that a distance of the current pixel from a fourth edge of the encoded current block exceeds a distance of the current pixel from the third edge, wherein the fourth edge is opposite the third edge. Generating the prediction value includes determining a sum of the second prediction pixel and the third prediction pixel, and determining, as the prediction value, a difference between the sum and a fourth prediction pixel from a fourth block, wherein the fourth block is adjacent to the second block and the third block, generating a reconstructed pixel corresponding to the current pixel based on the prediction value, and including the reconstructed pixel in the decoded current block. The method includes outputting or storing the decoded current block.

Variations in these and other aspects will be described in additional detail hereafter.

BRIEF DESCRIPTION OF THE DRAWINGS

The description herein makes reference to the accompanying drawings wherein.

DETAILED DESCRIPTION

Digital video is used for various purposes, including, for example, remote business meetings via video conferencing, high definition video entertainment, video advertisements, or sharing of user-generated videos. Video encoding and decoding (codec) can use various compression schemes. These compression schemes may include breaking a video image into blocks and generating a digital video output bitstream using one or more techniques to limit the information included in the output. A received bitstream can be decoded to re-create the blocks and the source images from the limited information.

Encoding a video stream, or a portion thereof, such as a frame or a block, can include using temporal and spatial similarities in the video stream to improve coding efficiency. For example, a current block of a video stream may be encoded based on a previously encoded block in the video stream by predicting motion and color information for the current block based on the previously encoded block and identifying a difference (residual) between the predicted values and the current block.

Intra prediction can include using video data that has been previously encoded and reconstructed to predict the current block in the same frame. The predicted block is deducted from the current block and the difference, i.e., the residual, can be transformed, quantized and entropy encoded to be included in a compressed video stream.

In some instances, intra prediction makes use of video data above and/or to the left of the current block to determine the prediction block for the current block. In many codec schemes such as the ones that use raster scanned coding, video data above and to the left of the current block have been previously coded (i.e., coded prior to the current block) and thus available for use during intra prediction of the current block.

In implementations of this disclosure, composite intra prediction modes can be used for intra prediction of the current block. Based on whether some or all sides peripheral to the current block have available video data, a composite intra prediction mode can use a different set of equations to produce the prediction block. For example, when it is determined that the video data in a column of pixels to the right of the current block has been coded or otherwise available for prediction, the encoder can use this additional information to improve the quality of intra prediction. Since the composite intra prediction mode can produce different prediction blocks based on the availability of surround pixels without requiring additional signaling cost, the overall coding efficiency is improved.

Figure 1:
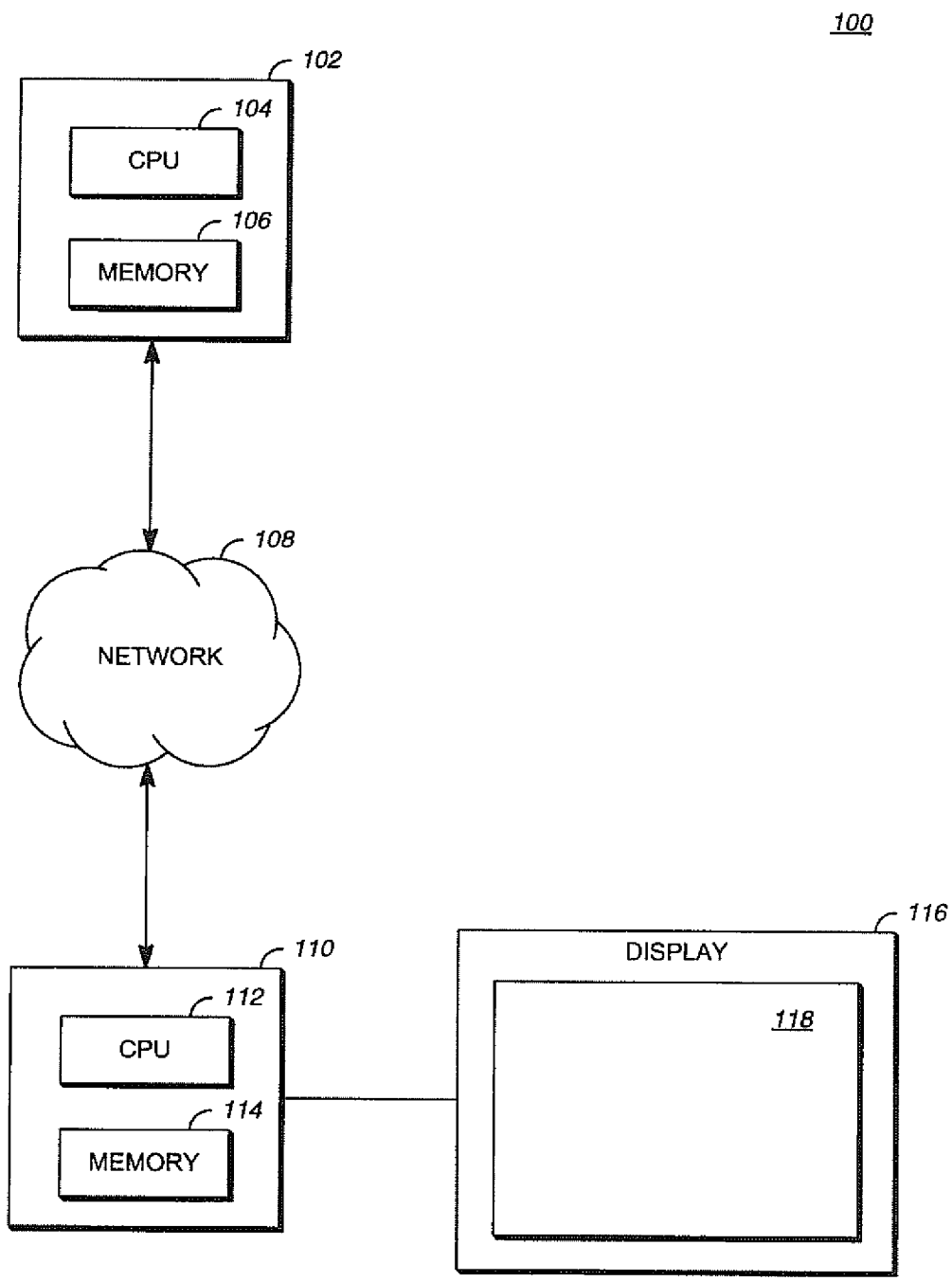
FIG. 1 is a schematic of a video encoding and decoding system in accordance with implementations of this disclosure.

These and other examples are now described with reference to the accompanying drawings. FIG. 1 is a schematic of a video encoding and decoding system 100 in which aspects of the disclosure can be implemented. An exemplary transmitting station 102 can be, for example, a computer having an internal configuration of hardware including a processor such as a central processing unit (CPU) 104 and a memory 106. CPU 104 is a controller for controlling the operations of transmitting station 102. CPU 104 can be connected to the memory 106 by, for example, a memory bus. Memory 106 can be read only memory (ROM), random access memory (RAM) or any other suitable memory device. Memory 106 can store data and program instructions that are used by CPU 104. Other suitable implementations of transmitting station 102 are possible. For example, the processing of transmitting station 102 can be distributed among multiple devices.

A network 108 connects transmitting station 102 and a receiving station 110 for encoding and decoding of the video stream. Specifically, the video stream can be encoded in transmitting station 102 and the encoded video stream can be decoded in receiving station 110. Network 108 can be, for example, the Internet. Network 108 can also be a local area network (LAN), wide area network (WAN), virtual private network (VPN), a cellular telephone network or any other means of transferring the video stream from transmitting station 102 to, in this example, receiving station 110.

Receiving station 110 can, in one example, be a computer having an internal configuration of hardware including a processor such as a CPU 112 and a memory 114. CPU 112 is a controller for controlling the operations of receiving station 110. CPU 112 can be connected to memory 114 by, for example, a memory bus. Memory 114 can be ROM, RAM or any other suitable memory device. Memory 114 can store data and program instructions that are used by CPU 112. Other suitable implementations of receiving station 110 are possible. For example, the processing of receiving station 110 can be distributed among multiple devices.

A display 116 configured to display a video stream can be connected to receiving station 110. Display 116 can be implemented in various ways, including by a liquid crystal display (LCD), a cathode-ray tube (CRT), or a light emitting diode display (LED), such as an OLED display. Display 116 is coupled to CPU 112 and can be configured to display a rendering 118 of the video stream decoded in receiving station 110.

Other implementations of the encoder and decoder system 100 are also possible. For example, one implementation can omit network 108 and/or display 116. In another implementation, a video stream can be encoded and then stored for transmission at a later time by receiving station 110 or any other device having memory. In one implementation, receiving station 110 receives (e.g., via network 108, a computer bus, or some communication pathway) the encoded video stream and stores the video stream for later decoding. In another implementation, additional components can be added to the encoder and decoder system 100. For example, a display or a video camera can be attached to transmitting station 102 to capture the video stream to be encoded.

Figure 2:
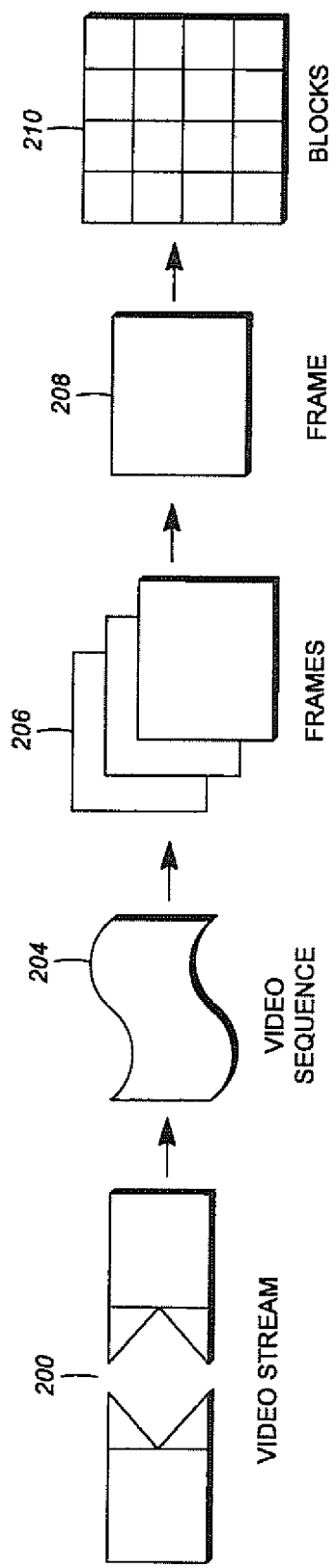
FIG. 2 is a diagram of an example video stream to be encoded and decoded in accordance with implementations of this disclosure.

FIG. 2 is a diagram of an example video stream 200 to be encoded and decoded. Video stream 200 (also referred to herein as video data) includes a video sequence 204. At the next level, video sequence 204 includes a number of adjacent frames 206. While three frames are depicted in adjacent frames 206, video sequence 204 can include any number of adjacent frames. Adjacent frames 206 can then be further subdivided into individual frames, e.g., a single frame 208.

Each frame 208 can capture a scene with one or more objects, such as people, background elements, graphics, text, a blank wall, or any other information.

At the next level, single frame 208 can be divided into a set of blocks 210, which can contain data corresponding to, in some of the examples described below, a 4×4 pixel group in frame 208. Block 210 can also be of any other suitable size such as a block of 16×8 pixels, a block of 8×8 pixels, a block of 16×16 pixels, a block of 8×8 pixels, or of any other size. Unless otherwise noted, the term 'block' can include a macroblock, a subblock (i.e., a subdivision of a macroblock), a segment, a slice, a residual block or any other portion of a frame. A frame, a block, a pixel, or a combination thereof can include display information, such as luminance information, chrominance information, or any other information that can be used to store, modify, communicate, or display the video stream or a portion thereof.

Figure 3:
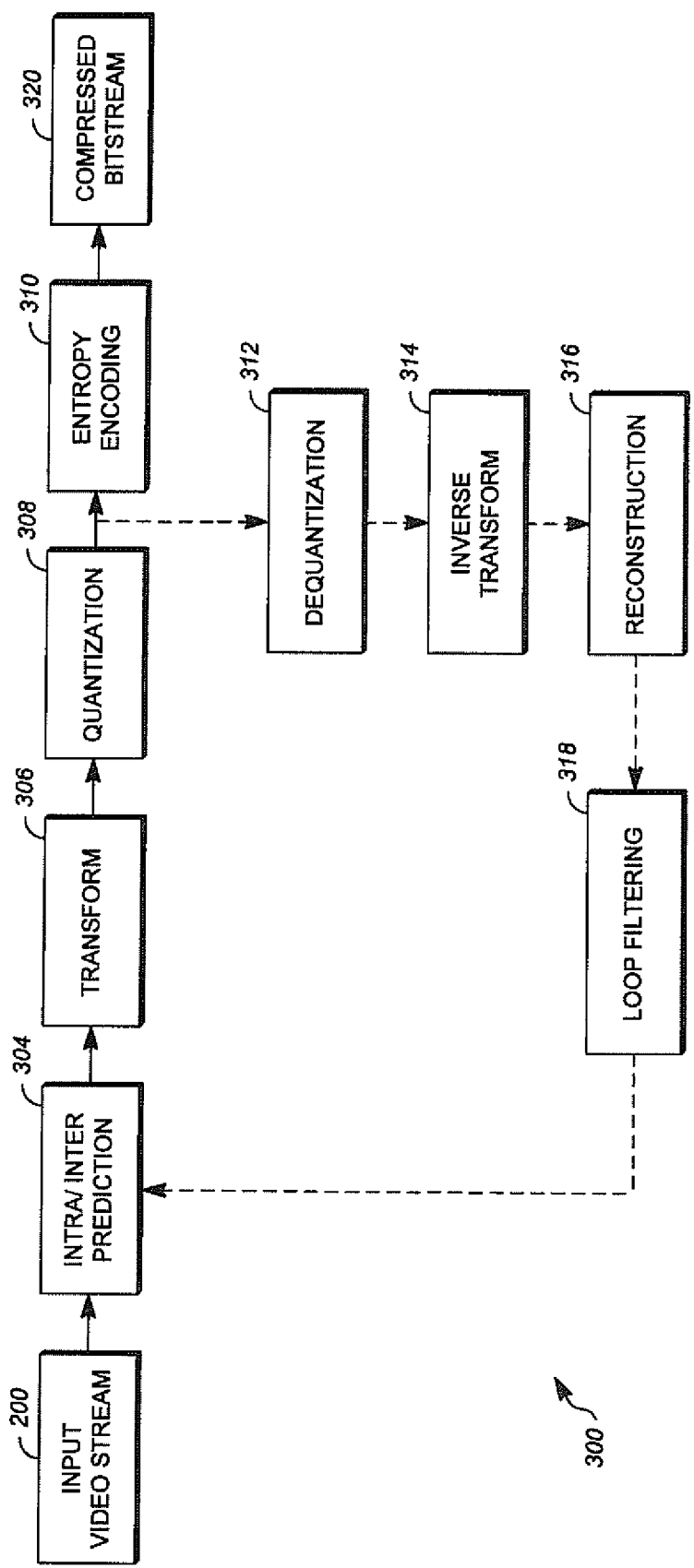
FIG. 3 is a block diagram of a video compression system in accordance with implementations of this disclosure.

FIG. 3 is a block diagram of an encoder 300 in accordance with implementations of this disclosure. Encoder 300 can be implemented, as described above, in transmitting station 102 such as by providing a computer software program stored in memory 106, for example. The computer software program can include machine instructions that, when executed by CPU 104, cause transmitting station 102 to encode video data in the manner described in FIG. 3. Encoder 300 can also be implemented as specialized hardware in, for example, transmitting station 102. Encoder 300 has the following stages to perform the various functions in a forward path (shown by the solid connection lines) to produce an encoded or a compressed bitstream 320 using input video stream 200: an intra/inter prediction stage 304, a transform stage 306, a quantization stage 308, and an entropy encoding stage 310. Encoder 300 may include a reconstruction path (shown by the dotted connection lines) to reconstruct a frame for encoding of future blocks. In FIG. 3, encoder 300 has the following stages to perform the various functions in the reconstruction path: a dequantization stage 312, an inverse transform stage 314, a reconstruction stage 316, and a loop filtering stage 318. Other structural variations of encoder 300 can be also used to encode video stream 200.

When video stream 200 is presented for encoding, each frame 208 within video stream 200 can be processed in units of blocks. Referring to FIG. 3, at intra/inter prediction stage 304, each block can be encoded using either intra prediction (i.e., within a single frame) or inter prediction (i.e. from frame to frame). In either case, a prediction block can be formed. The prediction block is then subtracted from the block to produce a residual block (also referred to herein as residual).

Intra prediction (also referred to herein as intra-prediction or intra-frame prediction) and inter prediction (also referred to herein as inter-prediction or inter-frame prediction) are techniques used in modern image/video compression schemes. In the case of intra-prediction, a prediction block can be formed from samples in the current frame that have been previously encoded and reconstructed. In the case of inter-prediction, a prediction block can be formed from samples in one or more previously reconstructed reference frames.

The prediction block is then subtracted from the block; the difference, i.e., the residual is then encoded and transmitted to decoders. Image or video codecs may support many different intra and inter prediction modes; each image block can use one of the prediction modes to provide a prediction block that is most similar to the block to minimize the information to be encoded in the residual. The prediction mode for each block can also be encoded and transmitted, so a decoder can use the same prediction mode(s) to form prediction blocks in the decoding and reconstruction process.

The prediction mode can be selected from one of multiple intra-prediction modes. The multiple intra-prediction modes can include, for example, DC prediction mode, horizontal prediction mode, vertical prediction mode, true motion prediction mode (which can also be referred to as TM_PRED), or one or more composite intra prediction mode (such as the ones described in FIGS. 5-7). In one implementation of DC prediction mode, a single value using the average of the pixels in a row above a current block and a column to the left of the current block can be used to predict the current block. In one implementation of horizontal prediction, each column of a current block can be filled with a copy of a column to the left of the current block. In one implementation of vertical prediction, each row of a current block can be filled with a copy of a row above the current block. In one implementation of TrueMotion prediction, in addition to the row above the current block and the column to the left of the current block, TM_PRED uses the pixel P above and to the left of the block. Horizontal differences between pixels in the row above the current block (starting from P) are propagated using the pixels from the column to the left of the current block to start each row. In some implementations of the composite intra prediction modes, in addition to the row above or the column to the left of the current block or pixel P, a row to the right, or a column below the current block, or any pixels to the top-right, bottom-left, or bottom-right of the current block may also be used to predict the current block. Other intra-prediction modes can also be used.

The prediction mode can also be selected from one of multiple inter-prediction modes using one or more reference frames including, for example, last frame, golden frame, alternative reference frame, or any other reference frame in an encoding scheme. The inter prediction modes can include, for example, ZERO_MV mode in which a block from the same location within a reference frame is used as the prediction block; NEW_MV mode in which a motion vector is transmitted to indicate the location of a block within a reference frame to be used as the prediction block; NEAREST_MV mode in which no motion vector is transmitted and the current block uses the last non-zero motion vector used by previously coded blocks to generate the prediction block. When an inter-prediction mode of NEW_MV is selected, a motion vector can be encoded, which describes the position of the prediction block relative to the current block (e.g., offsets of the coordinates). When an inter-prediction mode is selected, a motion vector can be encoded, which describes the position of the prediction block relative to the current block (e.g., offsets of the coordinates).

Next, still referring to FIG. 3, transform stage 306 transforms the residual into a block of transform coefficients in, for example, the frequency domain. Examples of block-based transforms include the Karhunen-Loeve Transform (KLT), the Discrete Cosine Transform (DCT), Walsh-Hadamard Transform (WHT), and the Singular Value Decomposition Transform (SVD). In one example, the DCT transforms the block into the frequency domain. In the case of DCT, the transform coefficient values are based on spatial frequency, with the lowest frequency (e.g., DC) coefficient at the top-left of the matrix and the highest frequency coefficient at the bottom-right of the matrix.

Quantization stage 308 converts the block of transform coefficients into discrete quantum values, which are referred to as quantized transform coefficients, using a quantizer value or quantization levels. The quantized transform coefficients are then entropy encoded by entropy encoding stage 310. The entropy-encoded coefficients, together with other information used to decode the block, which can include for example the type of prediction used, motion vectors, and quantization value, are then output to compressed bitstream 320. Compressed bitstream 320 can be formatted using various techniques, such as variable length encoding (VLC) and arithmetic coding. Compressed bitstream 320 can also be referred to as an encoded video stream and the terms will be used interchangeably herein.

The reconstruction path in FIG. 3 (shown by the dotted connection lines) can be used to provide both encoder 300 and a decoder 400 (described below) with the same reference frames to decode compressed bitstream 320. The reconstruction path performs functions that are similar to functions that take place during the decoding process that are discussed in more detail below, including dequantizing the quantized transform coefficients at dequantization stage 312 to generate dequantized transform coefficients and inverse transforming the dequantized transform coefficients at inverse transform stage 314 to produce a derivative residual block (i.e., derivative residual). At reconstruction stage 316, the prediction block that was predicted at intra/inter prediction stage 304 can be added to the derivative residual to create a reconstructed block. In some implementations, loop filtering stage 318 can be applied to the reconstructed block to reduce distortion such as blocking artifacts.

Other variations of encoder 300 can be used. For example, a non-transform based encoder 300 can quantize the residual block directly without transform stage 306. In another implementation, an encoder 300 can have quantization stage 308 and dequantization stage 312 combined into a single stage.

Figure 4:
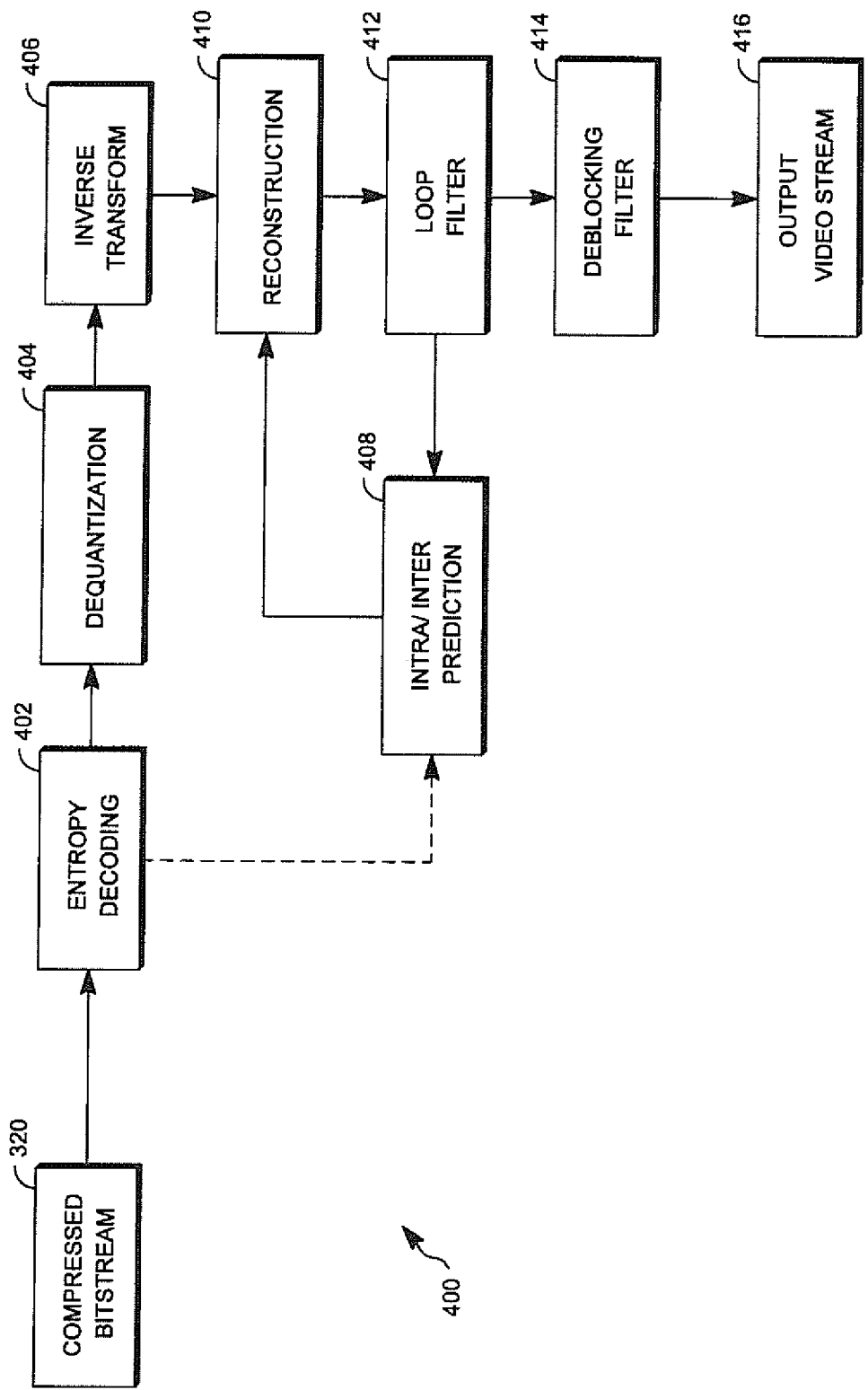
FIG. 4 is a block diagram of a video decompression system in accordance with implementations of this disclosure.

FIG. 4 is a block diagram of a decoder 400 in accordance with implementations of this disclosure. Decoder 400 can be implemented, for example, in receiving station 110, such as by providing a computer software program stored in memory for example. The computer software program can include machine instructions that, when executed by CPU 112, cause receiving station 110 to decode video data in the manner described in FIG. 4. Decoder 400 can also be implemented as specialized hardware or firmware in, for example, transmitting station 102 or receiving station 110.

Decoder 400, similar to the reconstruction path of encoder 300 discussed above, includes in one example the following stages to perform various functions to produce an output video stream 416 from compressed bitstream 320: an entropy decoding stage 402, a dequantization stage 404, an inverse transform stage 406, an intra/inter prediction stage 408, a reconstruction stage 410, a loop filtering stage 412, and a deblocking filtering stage 414. Other structural variations of decoder 400 can be used to decode compressed bitstream 320.

When compressed bitstream 320 is presented for decoding, the data elements within compressed bitstream 320 can be decoded by the entropy decoding stage 402 (using, for example, Context Adaptive Binary Arithmetic Decoding) to produce a set of quantized transform coefficients. Dequantization stage 404 dequantizes the quantized transform coefficients and inverse transform stage 406 inverse transforms the dequantized transform coefficients to produce a derivative residual that can be identical to that created by reconstruction stage 316 in encoder 300. Using header information decoded from compressed bitstream 320, decoder 400 can use intra/inter prediction stage 408 to create the same prediction block as was created in encoder 300, e.g., at intra/inter prediction stage 304.

At reconstruction stage 410, the prediction block can be added to the derivative residual to create a reconstructed block that can be identical to the block created by reconstruction stage 316 in encoder 300. In some implementations, loop filtering stage 412 can be applied to the reconstructed block to reduce blocking artifacts. Deblocking filtering stage 414 can be applied to the reconstructed block to reduce blocking distortion, and the result is output as output video stream 416. Output video stream 416 can also be referred to as a decoded video stream and the terms will be used interchangeably herein.

Other variations of decoder 400 can be used to decode compressed bitstream 320. For example, decoder 400 can produce output video stream 416 without deblocking filtering stage 414.

Figure 5:
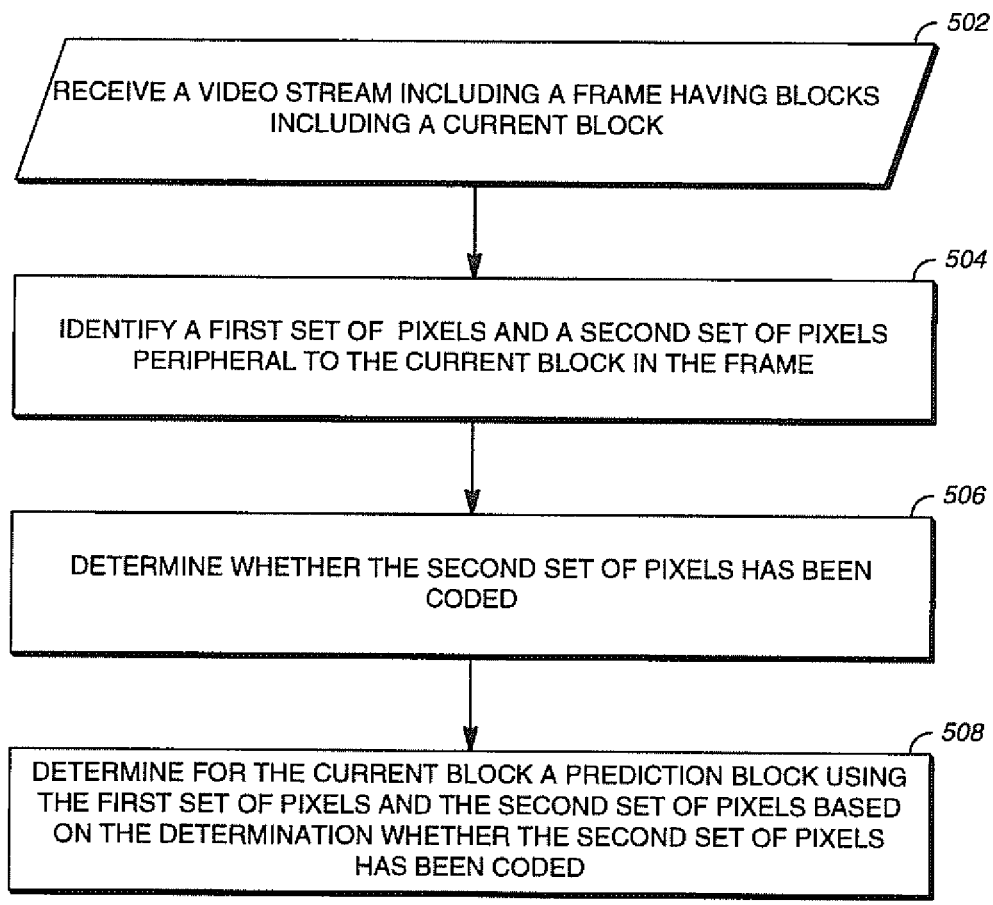
FIG. 5 is a flow diagram of an example method of operation for encoding a video stream using composite intra prediction modes in accordance with implementations of this disclosure.

FIG. 5 is a flowchart showing an example method of operation 500 for encoding a video stream using composite intra prediction modes in accordance with implementations of this disclosure. Method of operation 500 can be implemented in an encoder such as encoder 300 (shown in FIG. 3) and can be implemented, for example, as a software program that can be executed by computing devices such as transmitting station 102 or receiving station 110 (shown in FIG. 1). For example, the software program can include machine-readable instructions that can be stored in a memory such as memory 106 or memory 114, and that can be executed by a processor, such as CPU 104, to cause the computing device to perform method of operation 500.

Method of operation 500 can be implemented using specialized hardware or firmware. Some computing devices can have multiple memories, multiple processors, or both. The steps of method of operation 500 can be distributed using different processors, memories, or both. Use of the terms "processor" or "memory" in the singular encompasses computing devices that have one processor or one memory as well as devices that have multiple processors or multiple memories that can each be used in the performance of some or all of the recited steps.

Implementations of method of operation 500 can include, for example, receiving a video stream including a frame having blocks of video data including a current block at a step 502, identifying a first set of pixels and a second set of pixels peripheral to the current block in the frame at a step 504, determining whether the second set of pixels has been coded at a step 506, and determining, for the current block, a prediction block using the first set of pixels and the second set of pixels based on the determination of whether the second set of pixels has been coded at a step 508.

At step 502, a video stream including a frame having multiple blocks of video data including a current block can be received by a computing device, such as transmitting station 102. Received, as used herein, includes acquired, obtained, read, or received in any manner whatsoever. The video data or stream can be received in any number of ways, such as by receiving the video data over a network, over a cable, or by reading the video data from a primary memory or other storage device, including a disk drive or removable media such as a CompactFlash (CF) card, Secure Digital (SD) card, or any other device capable of communicating video data. In some implementations, video data can be received from a video camera connected to the computing device.

At step 504, a first set of pixels and a second set of pixels peripheral to the current block can be identified from the frame. The first set of pixels can include pixels from previously coded blocks in the frame. For example, the first set of pixels can be identified from a block above, to the left, or to the above-left of the current block in the frame. The second set of pixels can be identified from a block below, to the right, the above-right, the below-right, or the below-left of the current block in the same frame. The first or second set of pixels can be, for example, a set of reconstructed pixels determined using the reconstruction path in FIG. 3 at encoder 300.

The first or second set of pixels can be identified from a single block, or multiple blocks peripheral to the current block. For example, the first set of pixels can include pixels from a single block, such as the block to the left of the current block, and the second set of pixels can include pixels from multiple blocks, such as the block to the right of the current block and the block below the current block.

In some implementations, a composite intra prediction mode can be identified for the current block: the first set of pixels and the second set of pixels can be identified based the composite prediction mode. As will be described in detail below, the composite intra prediction mode can use different equations to produce a prediction block based on which sides of the current block have available pixel values for prediction. The composite intra prediction mode itself can be encoded and transmitted in the video stream.

In some implementations, the first set of pixels can include one or more rows of pixel values above the current block, or one or more columns of pixel values to the left of the current block, or a pixel from a block to the top-left of the current block, or any combination thereof. In other implementations, data from rows or columns not immediately adjacent to the current block, including data from blocks that are not adjacent to the current block, can be included in the first set of pixels. The second set of pixels can include a column of pixel values to the right of the current block, a row of pixel values below the current block, a pixel from a block to the bottom-right of the current block, a pixel from a block to the top-right of the current block, or a pixel from a block to the bottom-left of the current block, or any combination thereof.

At step 506, whether the second set of pixels has been coded can be determined. If the second set of pixels has been coded prior to the current block, the second set of pixels may be available to use for predicting the current block. If the second set of pixels has not been coded, the second set of pixels may not be available to use for predicting the current block. In some implementations, encoder 300 may use a scanning order other than the raster scanning order, which allows the blocks associated with the second set of pixels to be coded prior to the current block.

At step 508, a prediction block can be determined for the current block using the first set of pixels and the second set of pixels based on the determination of whether the second set of pixels has been coded.

If it has been determined at step 506 that the second set of pixels has not been coded, only the first set of pixels may be used to determine the prediction block. For example, at least a portion of the first set of pixels (e.g., a row, a column or a pixel) can be used to determine the prediction block for the current block.

If it has been determined at step 506 that the second set of pixels has been coded, the second set of pixels and the first set of pixels can both be used to determine the prediction block. For example, at least a portion of the first set of pixels and at least a portion of the second set of pixels can be used to determine the prediction block based on the determination that the second set of pixels has been coded.

In some implementations, a set of weighted values can be identified for the at least a portion of the first set of pixels and the at least a portion of the second set of pixels. For example, different weight values can be associated with different pixels in the first and second sets of pixels. The prediction block can be determined based on the set of weighted values and the corresponding pixel values in the first and second set of pixels, as shown by the examples in FIG. 6.

Although not shown in FIG. 5, the residual, which can be determined based on the difference between the current block and the prediction block, such as the prediction block determined at step 508, can be encoded. For example, the residual can be quantized at quantization stage 308, and entropy coded at entropy encoding stage 310. The encoded video stream 320 can be transmitted, stored, further processed, or a combination thereof. For example, the encoded video stream 320 can be stored in a memory, such as the memory 106 or 114 shown in FIG. 1. The encoded video stream 320 can also be transmitted to a decoder, such as the decoder 400 shown in FIG. 4.

Method of operation 500 is depicted and described as a series of steps. However, steps in accordance with this disclosure can occur in various orders or concurrently. Additionally, steps in accordance with this disclosure may occur with other steps not presented and described herein. Furthermore, not all illustrated steps may be required to implement a method of prediction using composite intra prediction modes.

Figure 6:
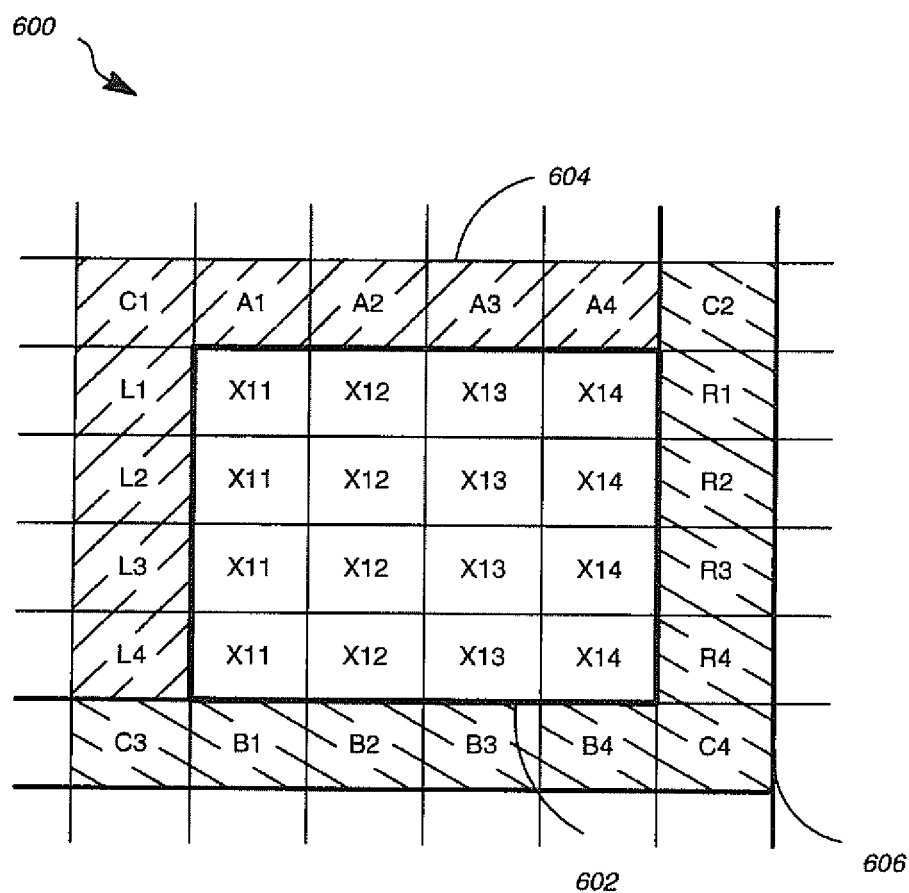
FIG. 6 is a diagram of an example of a frame including a current block in accordance with implementations of this disclosure.

FIG. 6 shows a diagram of an example of a frame 600 including a current block 602 in accordance with implementations of this disclosure. Frame 600 can include blocks of video data that have been coded prior to current block 602, such as blocks to the left or above of current block 602 in FIG. 6. Blocks, such as current block 602, are shown in FIG. 6 to have a set of 4×4 pixels, which can be represented by a 4×4 matrix X={Xij}, i, j=1,2,3,4. However, any other block size can be used.

As shown in FIG. 6, the first set of pixels, which can be identified at step 504, can include a set 604 of previously coded pixels. For example, the first set of pixels 604 can include a column of 4 pixels L1-L4 to the immediate left of current block 602, a row of 4 pixels A1-A4 immediately above of current block 602, or a pixel C1 to the above-left of current block 602, or any combination thereof. However, other previously coded pixels values (not shown in FIG. 6) can also be used.

The second set of pixels can include a set 606 of pixels as shown in FIG. 6. For example, the second set of pixels 606 can include a column of 4 pixels R1-R4 to the immediate right of current block 602, a row of 4 pixels B1-B4 below the current block, 3 pixels C2-C4 to the top-right (C2), below-left (C3), and below-right (C4) corner of current block 602, or any combination thereof.

In one example, a composite intra prediction mode for vertical prediction can be described as follows:

```
IF B is not available
    Pij = Aj                                    i, j=1,2,3,4
ELSE
    Pij = ( Aj *Wai + Bj *Wbi ) / (Wai + Wbi)   i, j=1,2,3,4
``` wherein Pij is the predicted value for pixel Xij in the current block; row A and row B are rows of 4 pixels immediately above and below the current block respectively; Wa and Wb are weighted values associated with row A and row B. (1)

In this example, when it is determined that row B, i.e., the row below current block 602, is not available (i.e., has not been coded), row A can be used for determining the predicted values Pij for current block 602. When it is determined that row B is available (i.e., has been coded), both rows A and B can be used for determining the predicted values Pij of the prediction block. The weighted values Wa (Wa1-Wa4) and Wb (Wb1-Wb4) can be adjusted for different applications.

In another example, a composite intra prediction mode for horizontal prediction can be described as follows:

```
IF R is not available
    Pij = Li                                       i, j=1,2,3,4
ELSE
    Pij = ( Li * Wlj + Ri * Wrj ) / (Wlj + Wrj)    i, j=1,2,3,4
``` wherein Pij is the predicted value for pixel Xij in the current block; column L and column R are columns of 4 pixels to the immediate left and right of the current block respectively; Wl and Wr are weighted values associated with column L and column R. (2)

In this example, when it is determined that column R, i.e., the column to the right of current block 602, is not available (i.e., has not been coded), column L can be used for determining the predicted values Pij of the prediction block for current block 602. When it is determined that column R is available (i.e., has been coded), both columns L and R can be used for determining the predicted values Pij of the prediction block. The weighted values Wl (Wl1-Wl4) and Wr (Wr1-Wr4) can be adjusted for different applications.

In another example, a composite TM_PRED prediction mode can be described as follows:

```
Pij = Li + Aj – C1                i,j=1,2,3,4
IF R and C2 are available
    Pij = Ri + Aj – C2            i=1,2; j=3,4
ELSE
    Pij = Li + Aj – C1            i=1,2; j=3,4
IF B and C3 are available
    Pij = Li + Bj – C3            i=3,4 ; j=1,2
ELSE
    Pij = Li + Aj – C1            i=3,4; j=1,2
IF R, B and C4 are available
    Pij = Ri + Bj – C4            i=3,4; j=3,4
ELSE
    Pij = Li + Aj – C1            i=3,4; j=3,4    (3)
``` wherein Pij is the predicted value for pixel Xij in the current block; row A and row B are rows of 4 pixels immediately above and below the current block respectively; column L and column R are columns of 4 pixels to the immediate left or right of the current block respectively.

In this example, the equations in (3) do not include weighted values. However, weighted values, such as Wa, Wb, Wl, Wj in (1) and (2), can be applied to rows A, B and columns L, R in (3). Other weighted values can also be used.

Figure 7:
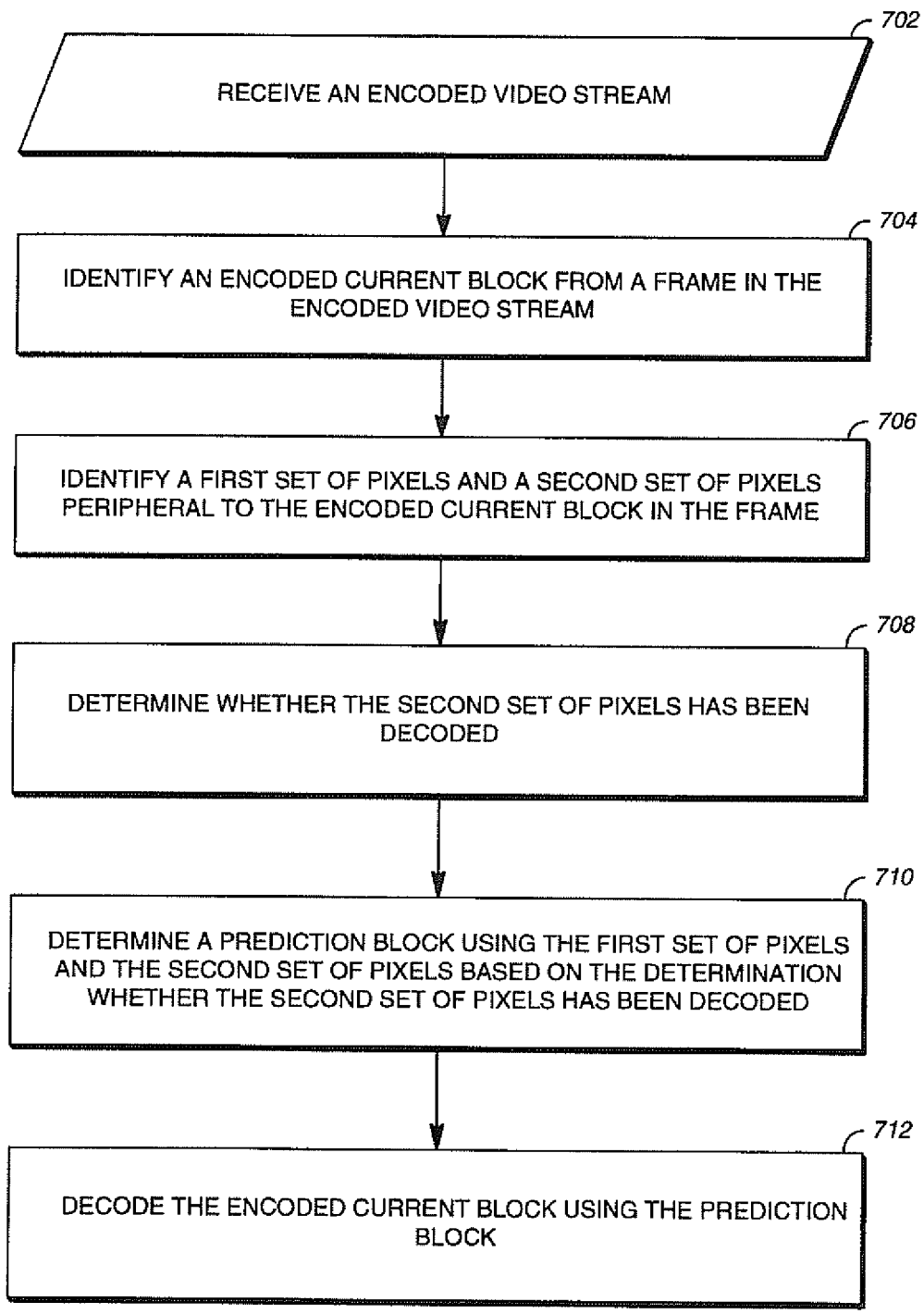
FIG. 7 is a flow diagram of an example method of operation for decoding a video stream using composite intra prediction modes in accordance with implementations of this disclosure.

FIG. 7 is a flowchart of an example method of operation 700 for decoding an encoded video stream using composite intra prediction modes in accordance with implementations of this disclosure. Method of operation 700 can be implemented, for example, as a software program that may be executed by computing devices such as transmitting station 102 or receiving station 110. For example, the software program can include machine-readable instructions that may be stored in a memory such as memory 106 or 114, and that, when executed by a processor, such as CPU 104 or 112, may cause the computing device to perform method of operation 700. Method of operation 700 can be implemented using specialized hardware or firmware. As explained above, some computing devices may have multiple memories or processors, and the steps of method of operation 700 can be distributed using multiple processors, memories, or both.

Implementations of decoding the encoded video stream can include, for example, receiving encoded video stream at a step 702, identifying an encoded current block from an frame in the encoded video stream at a step 704, identifying a first set of pixels and a second set of pixels in the frame at a step 706, determining whether the second set of pixels has been decoded at a step 708, determining a prediction block using the first set of pixels and the second set of pixels based on the determination of whether the second set of pixels has been decoded at a step 710, and decoding the encoded current block using the prediction block at a step 712.

At step 702, a computing device such as receiving station 110 may receive encoded video stream, such as compressed bitstream 320. The encoded video stream (which may be referred to herein as the encoded video data) can be received in any number of ways, such as by receiving the video data over a network, over a cable, or by reading the video data from a primary memory or other storage device, including a disk drive or removable media such as a DVD, Compact-Flash (CF) card, Secure Digital (SD) card, or any other device capable of communicating a video stream.

At step 704, an encoded current block can be identified from a frame in the encoded video stream. The encoded current block can be, for example, a block that has been encoded at encoder 300 using any of the composite intra prediction modes described herein, such as the composite horizontal or vertical prediction mode described in FIG. 6.

At step 706, a first set of pixels and a second set of pixels peripheral to the encoded current block can be identified from the frame in the video stream.

The first set of pixels can include pixels from previously decoded blocks in the frame, such as a block from the same frame as the current block that has been decoded prior to the current block. For example, the first set of pixels can be identified from a block above, to the left, or to the above-left of the current block in the same frame. The second set of pixels can be identified, for example, from a block below, to the right, above-right, below-right, or below-left of the current block in the same frame.

In some implementations, a composite intra prediction mode can be identified for the current block and the first set of pixels and the second set of pixels can be identified based the composite prediction mode. The composite intra prediction mode can be decoded from the video stream. The composite prediction modes can include any of the examples described in FIG. 6, or any other applicable composite prediction mode.

The first or second set of pixels can be identified from a single block in the frame, or multiple blocks peripheral to the current block in the same frame. For example, the first set of pixels can include pixels from multiple blocks, such as the block to the left of the current block and the block above the current block; the second set of pixels can also include pixels from multiple blocks, such as the block to the right of the current block and the block below the current block.

In some implementations, the first set of pixels can include one or more rows of pixel values above the current block, or one or more columns of pixel values to the left of the current block, or both. For example, the first set of pixels can include one of a column of pixels from the block to the left of the current block, a row of pixels from a block above the current block, a pixel from a block to the top-left of the current block, or any combination thereof. In other implementations, data from rows or columns not immediately adjacent to the current block, including data from blocks that are not adjacent to the current block, can be included in the first set of pixels.

In some implementations, the second set of pixels can include one of a column of pixels from a block to the right of the current block, a row of pixels from a block below the current block, a pixel from a block to the bottom-right of the current block, a pixel from a block to the top-right of the current block, or a pixel from a block to the bottom-left of the current block, or any combination thereof.

At step 708, whether the second set of pixels has been decoded can be determined. If the second set of pixels has been decoded prior to the current block, the second set of pixels may be available to use for predicting the current block. If the second set of pixels has not been decoded prior to the current block, the second set of pixels may not be available to use for predicting the current block. In some implementations, decoder 400 may use a scanning order other than the raster scanning order, which allows the blocks (such as a block to the right or below the current block) associated with the second set of pixels to be decoded prior to the current block.

At step 710, a prediction block is determined using the first set of pixels and the second set of pixels based on the determination of whether the second set of pixels has been decoded.

If the second set of pixels has been determined as not having been decoded, only the first set of pixels may be used to determine the prediction block. For example, at least a portion of the first set of pixels can be used to determine the prediction block for the current block.

If the second set of pixels has been determined as having been decoded, both the second set of pixels and the first set of pixels can be used to determine the prediction block. For example, at least a portion of the first set of pixels and at least a portion of the second set of pixels can be used to determine the prediction block based on the determination that the second set of pixels has been decoded.

In some implementations, a set of weighted values can be identified for the at least a portion of the first set of pixels and the at least a portion of the second set of pixels. For example, different weight values can be associated with different pixels in the first and second sets of pixels. The prediction block can be determined based on the set of weighted values and the corresponding pixel values in the first and second set of pixels. For example, the prediction block for the composite intra prediction modes described in FIG. 6 can be determined using the equations (1), (2) or (3) using the weighted values and the first or second set of pixels or both.

At step 712, the encoded current block can be decoded using the prediction block. For example, the encoded current block can be entropy decoded at entropy decoding stage 402, dequantized at dequantization stage 404, and inverse transformed at inverse transform stage 408 to determine a derived residual. The derived residual can be added to the prediction block determined for the current block at step 710 to reconstruct the current block at reconstruction stage 410. A frame can be reconstructed from the reconstructed blocks and the output can be an output video stream, such as the output video stream 416 shown in FIG. 4, and may be referred to as a decoded video stream.

Method of operation 700 is depicted and described as a series of steps. However, steps in accordance with this disclosure can occur in various orders or concurrently. Additionally, steps in accordance with this disclosure may occur with other steps not presented and described herein. Furthermore, not all illustrated steps may be required to implement a method in accordance with the disclosed subject matter.

The implementations of encoding and decoding described above illustrate some exemplary encoding and decoding techniques. However, "encoding" and "decoding", as those terms are used herein, could mean compression, decompression, transformation, or any other processing or change of data.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such.

A computing device implementing the techniques disclosed herein (and the algorithms, methods, instructions, etc. stored thereon and/or executed thereby) can be realized in hardware, software, or any combination thereof including, for example, IP cores, ASICS, programmable logic arrays, optical processors, programmable logic controllers, microcode, microcontrollers, servers, microprocessors, digital signal processors or any other suitable circuit or other information processing device, now existing or hereafter developed. In the claims, the term "processor" should be understood as encompassing any of the foregoing hardware, either singly or in combination. The terms "signal" and "data" are used interchangeably.

Further, in some implementations, for example, the techniques described herein can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

In some implementations, transmitting station 102 and receiving station 110 can, for example, be implemented on computers in a screencasting system. Alternatively, transmitting station 102 can be implemented on a server and receiving station 110 can be implemented on a device separate from the server, such as a hand-held communications device (i.e. a cell phone). In this instance, transmitting station 102 can encode content using an encoder 300 into an encoded video signal and transmit the encoded video signal to the communications device. In turn, the communications device can then decode the encoded video signal using a decoder 400. Alternatively, the communications device can decode content stored locally on the communications device, i.e. content that was not transmitted by transmitting station 102. Other suitable transmitting station 102 and receiving station 110 implementation schemes are available. For example, receiving station 110 can be a generally stationary personal computer rather than a portable communications device and/or a device including an encoder 300 may also include a decoder 400.

Further, all or a portion of implementations of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

Other embodiments or implementations may be within the scope of the following claims.

What is claimed is:

1. A method comprising:
generating, by a processor in response to instructions stored on a non-transitory computer readable medium, a decoded current block by decoding an encoded current block, wherein decoding the encoded current block includes adaptive composite intra-prediction, and wherein adaptive composite intra-prediction includes:
in response to a determination that a first prediction pixel from a first block immediately adjacent to a first edge of the encoded current block is available for predicting a current pixel of the encoded current block:
determining whether a second prediction pixel from a second block immediately adjacent to a second edge of the encoded current block is available for predicting the current pixel, wherein the second edge is opposite the first edge; and
in response to a determination that the second prediction pixel is available:
identifying a third prediction pixel from a third block immediately adjacent to a third edge of the encoded current block for predicting a current pixel of the encoded current block; and
generating a prediction value for the current pixel, wherein, on a condition that a distance of the current pixel from the first edge exceeds a distance of the current pixel from the second edge and on a condition that a distance of the current pixel from a fourth edge of the encoded current block exceeds a distance of the current pixel from the third edge, wherein the fourth edge is opposite the third edge, generating the prediction value includes:
determining a sum of the second prediction pixel and the third prediction pixel; and
determining, as the prediction value, a difference between the sum and a fourth prediction pixel from a fourth block, wherein the fourth block is adjacent to the second block and the third block;
generating a reconstructed pixel corresponding to the current pixel based on the prediction value; and
including the reconstructed pixel in the decoded current block; and
outputting or storing the decoded current block.

2. The method of claim 1, wherein the first edge is a left edge of the encoded current block, the second edge is a right edge of the encoded current block, and the third edge is a top edge of the encoded current block.

3. The method of claim 1, wherein the first edge is a top edge of the encoded current block, the second edge is a bottom edge of the encoded current block, and the third edge is a left edge of the encoded current block.

4. The method of claim 1, wherein:
the first edge is a top edge of the encoded current block, the second edge is a bottom edge of the encoded current block, and the third edge is a right edge of the encoded current block; or the first edge is a left edge of the encoded current block, the second edge is a right edge of the encoded current block, and the third edge is a bottom edge of the encoded current block.

* * * * *